(12) United States Patent
Visvesha et al.

(10) Patent No.: US 11,362,521 B2
(45) Date of Patent: Jun. 14, 2022

(54) OFFLINE MUTUAL AUTHENTICATION FOR BATTERY SWAPPING

(71) Applicant: OLA ELECTRIC MOBILITY PRIVATE LIMITED, Bengaluru (IN)

(72) Inventors: Jeevan Visvesha, Bengaluru (IN); Sathya Narayanan Nagarajan, Bengaluru (IN); Sachinraj Shetty, Bengaluru (IN); Shashi Chandra Ray, Bengaluru (IN)

(73) Assignee: OLA ELECTRIC MOBILITY PRIVATE LIMITED, Bengaluru (IN)

( * ) Notice: Subject to any disclaimer, the term of this patent is extended or adjusted under 35 U.S.C. 154(b) by 0 days.

(21) Appl. No.: 17/185,677

(22) Filed: Feb. 25, 2021

(65) Prior Publication Data

US 2021/0399566 A1     Dec. 23, 2021

(30) Foreign Application Priority Data

Jun. 22, 2020   (IN) .............................. 202041026141

(51) Int. Cl.
*H02J 7/00*       (2006.01)
*H04L 9/32*       (2006.01)
(Continued)

(52) U.S. Cl.
CPC .......... *H02J 7/00045* (2020.01); *B60L 53/65* (2019.02); *B60L 53/68* (2019.02); *B60L 53/80* (2019.02);
(Continued)

(58) Field of Classification Search
CPC ..... Y02T 10/70; Y02T 10/7072; Y02T 90/12; H04L 9/3263; H04L 2209/84;
(Continued)

(56) References Cited

U.S. PATENT DOCUMENTS

| | | |
|---|---|---|
| 9,137,025 B2 | 9/2015 | Lambert |
| 9,596,085 B2 | 3/2017 | Prakash et al. |
| 2013/0030608 A1* | 1/2013 | Taylor ..................... B60L 50/51 701/2 |

FOREIGN PATENT DOCUMENTS

| | | | | |
|---|---|---|---|---|
| GB | 2518248 A | * | 3/2015 | ............. B60L 58/12 |
| WO | WO-2021035298 A1 | * | 3/2021 | ............. B60L 53/665 |
| WO | WO-2021065929 A1 | * | 4/2021 | ............. B60L 53/65 |

* cited by examiner

*Primary Examiner* — Ryan Johnson
(74) *Attorney, Agent, or Firm* — Chip Law Group

(57) ABSTRACT

An offline mutual authentication method for battery swapping includes communicating a first authentication request to a battery by a computing device associated with a battery charger. A first authentication response is communicated to the computing device. The first authentication response is verified, and a first challenge request is communicated to the battery. A first challenge response is communicated to the computing device. The first challenge response is verified, and a battery authentication status is communicated to the battery. A second authentication request is communicated to the computing device. A second authentication response is communicated to the battery. The second authentication response is verified, and a second challenge request is communicated to the computing device. A second challenge response is communicated to the battery. The second challenge response is verified, and a charger authentication status is communicated by the battery to the computing device.

16 Claims, 10 Drawing Sheets

(51) Int. Cl.
*B60L 53/65* (2019.01)
*B60L 53/68* (2019.01)
*B60L 53/80* (2019.01)
*H04L 9/40* (2022.01)

(52) U.S. Cl.
CPC ........ *H02J 7/00036* (2020.01); *H04L 9/3268* (2013.01); *H04L 9/3273* (2013.01); *H04L 63/0823* (2013.01); *H04L 2209/84* (2013.01)

(58) Field of Classification Search
CPC ..... H04L 63/0823; H04L 9/32; H04L 9/3271; H04L 9/3273; H04L 2209/38; H04L 63/08; H04L 2012/40215; G06F 21/44; G06F 21/33; B60L 53/65; B60L 53/68; B60L 53/80; B60L 53/305; H02J 7/00045; H02J 7/00036; B60S 5/06

See application file for complete search history.

OFFLINE MUTUAL AUTHENTICATION FOR BATTERY SWAPPING

CROSS-RELATED APPLICATIONS

This application claims priority of Indian Non-Provisional Application No. 202041026141, filed Jun. 22, 2020, the contents of which are incorporated herein by reference.

FIELD

Various embodiments of the disclosure relate generally to authentication. More specifically, various embodiments of the disclosure relate to offline mutual authentication for battery swapping.

BACKGROUND

Traditionally, travelling has been an important part of an individual's day-to-day life. The individual may be required to travel for various reasons such as work, education, vacation, or the like. Generally, the individual may use various modes of transportation, such as a two-wheeler vehicle, a three-wheeler vehicle, a four-wheeler vehicle, or the like, for travelling. These vehicles may be fuel-based vehicles that require fossil fuel (for example, petrol or diesel) to power their engines. However, such fossil fuel-based vehicles produce a large amount of heat, pollution, and noise which may be undesirable and may lead to global warming and many health hazards. Also, the fossil fuel used in these vehicles are scarcely available in the nature and needs to be conserved. Also, due to humongous demand, the fossil fuel may become increasingly expensive and may not be affordable by the individual. Furthermore, the efficiency of the fossil fuel-based vehicles is poor.

Nowadays, the fossil fuel-based vehicles are being replaced by electric vehicles that use one or more electric motors or traction motors for propulsion. An electric vehicle may be powered through a collector system by electricity from off-vehicle sources or may be self-contained with one or more batteries. When an electric vehicle operates using charged batteries, energy is lost during the process of converting electrical energy to the mechanical energy, and hence the charged batteries discharge as per the usage. The discharged batteries of the electric vehicle are either charged periodically or swapped with charged batteries for its functioning. However, swapping or charging of the discharged batteries at a battery swapping and charging station may pose some risks leading to security concerns. Such security concerns may include use of an unauthorized charger for charging of the batteries or an unauthorized swapping station for swapping of the batteries. These concerns may further include use of an unauthorized discharged battery for obtaining a charged battery, use of an unauthorized discharged battery for charging using a charger associated with the battery swapping and charging station, or the like.

In light of the above concerns, the discharged batteries of the electric vehicle and the charger at the battery swapping and charging station are required to be authenticated prior to swapping or charging of the discharged batteries. Presently, such authentication is performed by way of a server arrangement that authenticates the discharged batteries of the electric vehicle and the charger associated with the battery swapping and charging station. However, when a connectivity to the server arrangement is lost, the authentication of the discharged batteries and the charger may be disrupted. Furthermore, during such online authentication, sensitive information associated with the electric vehicle, the one or more batteries, the driver, and the charger may be exposed to a third-party via an unsecured network. Further, an intruder may carry a sniffer for obtaining the sensitive information. The sensitive information may later be used by the intruder to carry a replay attack that may lead to various security concerns (such as misuse and theft) associated with the electric vehicle, the batteries of the electric vehicle, the driver of the electric vehicle, and the charger associated with the battery swapping and charging station.

The aforementioned security concerns not only lead to financial loss but also cause emotional despair to an owner or the driver of the electric vehicle. Furthermore, other parties such as a vendor or owner of the battery swapping and charging station and a company producing the batteries and the charger also suffer financial loss caused due to cost, time and effort spent in inquiry, reimbursement, and replacement of the one or more batteries and the charger. In light of the foregoing, there exists a need for a technical and reliable solution that overcomes the above-mentioned problems, challenges, and short-comings, and continues to facilitate a secured mutual authentication between one or more batteries of an electric vehicle and a charger at a battery swapping and charging station in a manner that prevents stealing and misuse of the one or more batteries and the charger.

SUMMARY

Offline mutual authentication for battery swapping is provided substantially as shown in, and described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
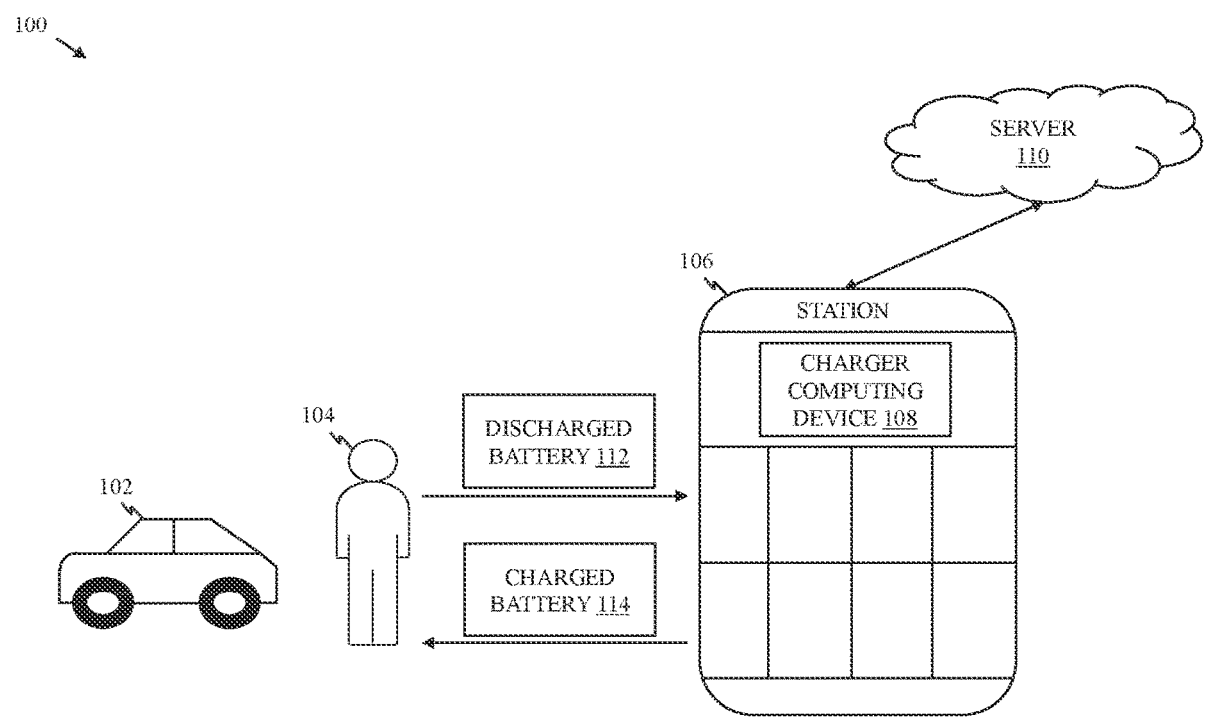
FIG. 1 is a block diagram that illustrates a system environment for offline mutual authentication for battery swapping, in accordance with an exemplary embodiment of the disclosure.

Certain embodiments of the disclosure may be found in a disclosed apparatus for performing an offline mutual authentication for battery swapping. Exemplary aspects of the disclosure provide an offline mutual authentication method and system for performing an offline authentication between a battery of an electric vehicle and a charger computing device of a battery swapping and charging station. The method includes one or more operations that are executed by circuitry of the battery of the electric vehicle and the charger computing device of the battery swapping and charging station to perform the offline mutual authentication. In an embodiment, the charger computing device may be configured to initiate the offline mutual authentication when the battery swapping and charging station receives a battery (such as a discharged battery) from a user for the battery swapping. The charger computing device may be configured to communicate a first authentication request to the battery via a controller area network (CAN) bus. Based on the received first authentication request, the battery may be configured communicate a first authentication response to the charger computing device via the CAN bus. The first authentication response may include at least one of a battery certificate or a battery manufacturer certificate associated with the battery. The charger computing device may be further configured to verify at least one of the battery certificate or the battery manufacturer certificate. At least one of the battery certificate or the battery manufacturer certificate may be verified based on an intermediate certificate and a root certificate.

In an embodiment, the charger computing device may be further configured to generate a first random number. The charger computing device may be further configured to generate a first challenge request including at least the first random number and communicate the first challenge request to the battery via the CAN bus. The first challenge request may be communicated to the battery based on successful verification of at least one of the battery certificate or the battery manufacturer certificate. In an embodiment, the battery may be further configured to communicate a first challenge response corresponding to the first challenge request to the charger computing device via the CAN bus. The first challenge response may include the first challenge request signed by the battery using a battery private key.

In an embodiment, the charger computing device may be further configured to verify the first challenge response by using a battery public key. The charger computing device may be further configured to generate a random identifier and communicate a battery authentication status (and/or the random identifier) to the battery via the CAN bus. The battery authentication status (and/or the random identifier) may be communicated to the battery based on successful verification of the first challenge response.

In an embodiment, the battery may be further configured to communicate a second authentication request (and/or the random identifier) to the charger computing device via the CAN bus. The charger computing device may be further configured to verify the random identifier. Further, based on the second authentication request (and/or upon successful verification of the random identifier), the charger computing device may be configured to communicate a second authentication response to the battery via the CAN bus. The second authentication response may include at least one of a charger certificate or a charger manufacturer certificate. In an embodiment, the battery may be further configured to verify at least one of the charger certificate or the charger manufacturer certificate. At least one of the charger certificate or the charger manufacturer certificate may be verified based on the intermediate certificate and the root certificate.

In an embodiment, based on successful verification of at least one of the charger certificate or the charger manufacturer certificate, the battery may be further configured to generate a second random number. The battery may be further configured to generate a second challenge request including at least the second random number and communicate the second challenge request to the charger computing device via the CAN bus. The charger computing device may be further configured to communicate a second challenge response corresponding to the second challenge request to the battery via the CAN bus. The second challenge response may include the second challenge request signed by the charger computing device using a charger private key. The battery may be further configured to verify the second challenge response by using a charger public key. Subsequently, the battery may be further configured to communicate a charger authentication status to the charger computing device via the CAN bus. The charger authentication status may be communicated based on successful verification of the second challenge response.

Thus, various methods and systems of the disclosure provide an offline mutual authentication for battery swapping. The disclosed methods and systems facilitate the offline mutual authentication between the battery of the electric vehicle and the charger computing device of the battery swapping and charging station. The offline mutual authentication prevents security risks and misuse of the battery and a charger associated with the battery swapping and charging station. The disclosed methods and systems create a secure offline mutual authentication mechanism that avoids network dependency as it is complete offline based. The offline mutual authentication mechanism helps in stopping any sniffing attack as the information used for the authentication are not sensitive in nature. Therefore, significantly reducing a probability of fraud and unauthorized use of the battery and the charger. The offline mutual authentication mechanism helps in avoiding leakage of database of the information. The offline mutual authentication mechanism performs the strongest authentication using one or more certificates associated with the battery and the charger. The offline mutual authentication mechanism also verifies private keys associated with the battery and the charger during the process of challenging each other. Furthermore, during the battery swapping process, the offline mutual authentication between the battery and the charger ensures reliability and compatibility of the battery with the charger, or vice-versa since both can trust each other.

FIG. 1 is a block diagram that illustrates a system environment 100 for offline mutual authentication for battery swapping, in accordance with an exemplary embodiment of the disclosure. The system environment 100 includes an electric vehicle 102 associated with a user 104, a battery swapping and charging station 106, a charger computing device 108 associated with the battery swapping and charging station 106, and a server 110. The system environment 100 further includes a discharged battery 112 (hereinafter, referred to as the battery 112) of the electric vehicle 102 and a charged battery 114 (hereinafter, referred to as the battery 114) provided by the battery swapping and charging station 106. In an embodiment, the battery swapping and charging station 106 and the server 110 may communicate with each other via a communication network (not shown). Examples of the communication network may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof. In some embodiments, various entities (such as the electric vehicle 102 and the server 110) in the system environment 100 may be coupled to the communication network in accordance with various wired and wireless communication protocols, such as Transmission Control Protocol and Internet Protocol (TCP/IP), User Datagram Protocol (UDP), Long Term Evolution (LTE) communication protocols, or any combination thereof.

The electric vehicle 102 is a mode of transportation that is utilized, by the user 104 (such as a driver), to commute from one location to another location. The electric vehicle 102 may include suitable logic, circuitry, interfaces and/or code, executable by the circuitry, that may be configured to control and perform one or more operations with or without any driving assistance from the driver. In an embodiment, the electric vehicle 102 may be deployed by a transport service provider (e.g., a cab service provider) to cater to travelling requirements of various passengers. In another embodiment, the electric vehicle 102 may be privately owned by the user 104 and may be used for fulfilling self-travelling requirements. The electric vehicle 102 may be a vehicle that uses one or more electric motors or traction motors for propulsion. The electric vehicle 102 may be powered through a collector system by electricity from off-vehicle sources, or may be self-contained with one or more batteries (such as the battery 112) that are swappable with other similar one or more batteries (such as the battery 114) as and when required or chargeable by using a battery charger (not shown) associated with the battery swapping and charging station 106. The one or more charged batteries may be utilized for providing necessary power (such as electrical and mechanical power) to the electric vehicle 102. Examples of the electric vehicle 102 may include, but are not limited to, an automobile, a bus, a car, an auto rickshaw, and a bike.

The user 104 is an individual associated with the electric vehicle 102. The user 104 may be an owner or a driver of the electric vehicle 102. The user 104 may use the electric vehicle 102 for fulfilling self-travelling requirements or for providing ride services to one or more passengers who have initiated one or more ride requests for one or more rides in an online manner. The user 104 may provide one or more instructions to the electric vehicle 102 via one or more user interfaces rendered on a standalone computing device (not shown) installed in the electric vehicle 102 or a user device (not shown) associated with the user 104 for controlling one or more vehicle operations. Examples of the standalone computing device or the user device may include, but are not limited to a tablet, a computer, a laptop, a mobile phone, or the like. The user 104 may further use the standalone computing device or the user device to view a battery identifier (ID), health data (that indicates a state of health relative to its ideal condition), charging level data (that indicates a level of charge relative to its ideal capacity), historical authentication data, or the like associated with the one or more batteries of the electric vehicle 102.

The battery swapping and charging station 106 is a station that facilitates battery swapping services, battery charging services, or both to one or more users (such as the user 104) who may want to swap one or more discharged batteries (such as the battery 112) with one or more charged batteries (such as the battery 114) or may want to charge the one or more discharged batteries (such as the battery 112). The battery swapping and charging station 106 may include suitable logic, circuitry, interfaces and/or code, executable by the circuitry, that may be configured to control and perform one or more operations associated with the battery swapping, the battery charging, or both. In an exemplary embodiment, the battery swapping and charging station 106 may include a charging and storing platform for charging the one or more discharged batteries (such as the battery 112) and storing the one or more charged batteries (such as the battery 114). The charging platform may include one or more charging slots that are utilized to charge the one or more discharged batteries. The storing platform may include one or more storing slots that are utilized to store the one or more charged batteries. The one or more discharged batteries may be charged by using the battery charger associated with the battery swapping and charging station 106. The battery charger may include suitable logic, circuitry, interfaces, and/or code, executable by the circuitry, that may be configured to control and perform one or more operations associated with charging and managing various batteries of various types. The battery swapping and charging station 106 may further include a swapping platform for receiving the one or more discharged batteries (such as the battery 112) to be swapped from the user 104 and releasing the one or more charged batteries (such as the battery 114) from the charging and storing platform. Each discharged battery (such as the battery 112) received at the swapping platform is assigned a corresponding charging slot in the charging platform for charging. After each discharged battery is charged to a required charging level, a corresponding storing slot in the storing platform is assigned for storing each charged battery.

The charger computing device 108 may include suitable logic, circuitry, interfaces, and/or code, executable by the circuitry, that may be configured to perform one or more operations associated with the battery swapping, the battery charging, or both. For example, the charger computing device 108 may be configured to process, control, and manage various functionalities and operations such as swap request reception, charging request reception, user authentication, battery reception, battery selection, ID assignment, battery configuration, battery release, or the like. Further, the charger computing device 108 may be configured to process, control, and manage various functionalities and operations associated with the offline mutual authentication during the battery swapping, the battery charging, or both. In an exemplary embodiment, the charger computing device 108 may be configured to generate and communicate a first authentication request to the battery 112 of the electric vehicle 102 when the user 104 has provided the battery 112 to the battery swapping and charging station 106, either for performing the battery swapping or the battery charging. In response to the first authentication request, the charger computing device 108 may be configured to receive a first authentication response from the battery 112. The first authentication response may include at least one of a battery certificate or a battery manufacturer certificate associated with the battery 112. The charger computing device 108 may be further configured to verify at least one of the battery certificate or the battery manufacturer certificate. At least one of the battery certificate or the battery manufacturer certificate may be verified based on an intermediate certificate and a root certificate. The charger computing device 108 may be further configured to generate a first random number. The charger computing device 108 may be further configured to generate a first challenge request including at least the first random number and communicate the first challenge request to the battery 112. The first challenge request may be communicated to the battery 112 based on successful verification of at least one of the battery certificate or the battery manufacturer certificate. The charger computing device 108 may be further configured to receive a first challenge response corresponding to the first challenge request from the battery 112. The first challenge response may include the first challenge request signed by the battery 112 using a battery private key. The charger computing device 108 may be further configured to verify the first challenge response by using a battery public key. By using this step of verification, the charger computing device 108 verifies the proof of possession of the battery private key by the battery 112. The charger computing device 108 may be further configured to generate a random identifier and communicate a battery authentication status and the random identifier to the battery 112. The battery authentication status and the random identifier may be communicated to the battery 112 based on successful verification of the first challenge response. The battery authentication status may indicate successful authentication of the battery 112 by the charger computing device 108 of the battery charger associated with the battery swapping and charging station 106. In some embodiments, the generation of the random identifier may be optional. Thus, the charger computing device 108 may communicate the random identifier along with the battery authentication status to the battery 112 only when the random identifier is generated by the charger computing device 108. However, the charger computing device 108 may only communicate the battery authentication status to the battery 112 when the random identifier is not generated by the charger computing device 108.

The charger computing device 108 may be further configured to receive a second authentication request from the battery 112. The charger computing device 108 may further receive the random identifier from the battery 112 only when the random identifier has been previously generated and communicated by the charger computing device 108 to the battery 112. The charger computing device 108 may be further configured to verify the random identifier. Further, in response to the second authentication request (and/or upon successful verification of the random identifier), the charger computing device 108 may be configured to communicate a second authentication response to the battery 112. The second authentication response may include at least one of a charger certificate or a charger manufacturer certificate associated with the battery charger of the battery swapping and charging station 106. The charger computing device 108 may be further configured to receive a second challenge request including at least a second random number. The charger computing device 108 may be further configured to communicate a second challenge response corresponding to the second challenge request to the battery 112. The second challenge response may include the second challenge request signed by using a charger private key. Based on successful verification of the second challenge response by the battery 112, the charger computing device 108 may be further configured to receive a charger authentication status. The charger authentication status may indicate successful authentication of the battery charger associated with the battery swapping and charging station 106 by the battery 112.

The server 110 may include suitable logic, circuitry, interfaces, and/or code, executable by the circuitry, that may be configured to perform one or more operations associated with the management of one or more charged or discharged batteries. The server 110 may be a computing device, which may include a software framework, that may be configured to create the application implementation and perform the one or more operations associated with the charging and managing of the one or more charged or discharged batteries. The server 110 may be realized through various web-based technologies, such as, but are not limited to, a Java web-framework, a .NET framework, a PHP framework, a python framework, or any other web-application framework. The server 110 may also be realized as a machine-learning model that implements any suitable machine-learning techniques, statistical techniques, or probabilistic techniques. Examples of such techniques may include expert systems, fuzzy logic, support vector machines (SVM), Hidden Markov models (HMMs), greedy search algorithms, rule-based systems, Bayesian models (e.g., Bayesian networks), neural networks, decision tree learning methods, other non-linear training techniques, data fusion, utility-based analytical systems, or the like. Examples of the server 110 may include, but are not limited to, a personal computer, a laptop, or a network of computer systems.

In an embodiment, the server 110 may be communicatively coupled to the electric vehicle 102 and the charger computing device 108 over one or more communication networks. In an embodiment, the server 110 may be configured to process, control, and manage various functionalities and operations such as battery charging, battery swapping, user authentication, battery reception, battery selection, ID assignment, battery configuration, battery release, or the like. The server 110 may be further configured to receive assignment data associated with the one or more discharged or charged batteries of one or more electric vehicles such as the electric vehicle 102. For example, the data may include a vehicle identifier of the electric vehicle 102, a battery identifier of the battery 112, a battery identifier of the battery 114, or the like.

A battery (such as the battery 112 or 114) is a device that consists of one or more electrochemical cells with external connections to one or more electric motors (such as traction motors, universal motors, induction motors, or the like) of the electric vehicle 102 for propulsion. When a charged battery (such as the battery 114) is supplying electrical energy, its positive terminal is referred to as a cathode and its negative terminal is referred to as an anode. The terminal marked as negative is a source of electrons that may flow through an external electric circuit to the positive terminal. When the charged battery is connected to an external electric load, a redox reaction converts high-energy reactants to lower-energy products, and the free-energy difference is delivered to the external circuit as the electrical energy. During the propulsion of the electric vehicle 102, this electrical energy is converted into mechanical energy by using an electric engine (i.e., one or more electric motors such as DC brushless motors, AC induction motors, permanent magnet motors, or the like) of the electric vehicle 102. In an exemplary embodiment, the battery may correspond to a rechargeable battery, a swappable battery, or a swappable and replaceable battery. Further, each battery may include one or more battery packs including one or more cells. Examples of the battery 112 or 114 may include, but are not limited to, a lead acid battery, a Nickel Cadmium (NiCd) battery, a Nickel Metal Hydride (NIMH) battery, a lithium ion battery, a zinc air battery, or the like.

The battery 112 or 114 may include suitable logic, circuitry, interfaces, and/or code, executable by the circuitry, that may be configured to perform one or more operations associated with the offline mutual authentication during the battery swapping, the battery charging, or both. In an exemplary embodiment, when the battery 112 is provided by the user 104 to the battery swapping and charging station 106 for swapping or charging, the battery 112 may be required to be mutually authenticated with the charger computing device 108 prior to initiation of the swapping or charging process. In order to perform the offline mutual authentication, the battery 112 may be configured to receive the first authentication request from the charger computing device 108. Based on the received first authentication request, the battery 112 may be further configured to communicate the first authentication response to the charger computing device 108. The first authentication response may include at least one of the battery certificate or the battery manufacturer certificate associated with the battery 112. Based on successful verification of at least one of the battery certificate or the battery manufacturer certificate by the charger computing device 108, the battery 112 may be further configured to receive the first challenge request from the charger computing device 108. The battery 112 may be further configured to communicate the first challenge response corresponding to the first challenge request to the charger computing device 108. The first challenge response may include the first challenge request signed by the battery 112 using the battery private key. Based on successful verification of the first challenge response by the charger computing device 108, the battery 112 may be further configured to receive the battery authentication status (and/or the random identifier) from the charger computing device 108. The battery authentication status may indicate successful authentication of the battery 112 by the charger computing device 108 of the battery charger associated with the battery swapping and charging station 106. Further, the battery 112 may be configured to generate and communicate the second authentication request (and/or the random identifier) to the charger computing device 108. The battery 112 may be further configured to receive the second authentication response from the charger computing device 108. The second authentication response may include at least one of the charger certificate or the charger manufacturer certificate associated with the battery charger. The battery 112 may be further configured to verify at least one of the charger certificate or the charger manufacturer certificate. At least one of the charger certificate or the charger manufacturer certificate may be verified based on the intermediate certificate and the root certificate. Upon successful verification of at least one of the charger certificate or the charger manufacturer certificate, the battery 112 may be further configured to generate the second random number. The battery 112 may be further configured to generate the second challenge request including the second random number and communicate the second challenge request to the charger computing device 108. The battery 112 may be further configured to receive the second challenge response corresponding to the second challenge request from the charger computing device 108. The second challenge response may include the second challenge request signed by using the charger private key. The battery 112 may be further configured to verify the second challenge response by using the charger public key. By using this step of verification, the battery 112 verifies the proof of possession of the charger private key by the charger computing device 108. Based on successful verification of the second challenge response, the battery 112 may be further configured to communicate the charger authentication status to the charger computing device 108. The charger authentication status may indicate successful authentication of the battery charger associated with the battery swapping and charging station 106 by the battery 112.

In operation, the charger computing device 108 may be configured to initiate the offline mutual authentication between the battery 112 and the battery charger of the battery swapping and charging station 106 when the battery swapping and charging station 106 receives the battery 112 from the user 104 for the battery swapping or the battery charging. The charger computing device 108 may be configured to communicate the first authentication request to the battery 112 via a controller area network (CAN) bus (shown in FIG. 2). Based on the received first authentication request, the battery 112 may be configured communicate the first authentication response to the charger computing device 108 via the CAN bus. The first authentication response may include at least one of the battery certificate or the battery manufacturer certificate associated with the battery 112. The battery certificate may be a digital certificate that certifies an authenticity of the battery 112. The battery manufacturer certificate may be a digital certificate that certifies an authenticity of a manufacturer of the battery 112.

In an embodiment, the charger computing device 108 may be further configured to verify at least one of the battery certificate or the battery manufacturer certificate. At least one of the battery certificate or the battery manufacturer certificate may be verified based on the intermediate certificate and the root certificate. The root certificate and the intermediate certificate are digital certificates that may be used to verify the authenticity of at least one of the battery certificate or the battery manufacturer certificate. The battery certificate, the battery manufacturer certificate, the root certificate, and the intermediate certificate together form a correlated chain of trust that ensures the authenticity of the battery 112.

In an exemplary embodiment, the number of certificates included in the first authentication response may depend on a level of certificate chain (such as 3 levels of certificate chain or 4 levels of certificate chain) implemented for executing the offline mutual authentication between the battery 112 and the battery charger of the battery swapping and charging station 106. For example, in the 3 levels of certificate chain, 3 certificates such as the battery certificate, the intermediate certificate, and the root certificate may be used. In such a case, the first authentication response may only include the battery certificate that is verified by using the intermediate certificate and the root certificate. However, in the 4 levels of certificate chain, 4 certificates such as the battery certificate, the battery manufacturer certificate, the intermediate certificate, and the root certificate may be used. In such a case, the first authentication response may include the battery certificate and the battery manufacturer certificate that are verified by using the intermediate certificate and the root certificate.

In an embodiment, the charger computing device 108 may be further configured to generate the first random number. The charger computing device 108 may be further configured to generate the first challenge request including at least the first random number and communicate the first challenge request to the battery 112 via the CAN bus. The first challenge request may be communicated to the battery 112 based on successful verification of at least one of the battery certificate or the battery manufacturer certificate. In an embodiment, the battery 112 may be further configured to communicate the first challenge response corresponding to the first challenge request to the charger computing device 108 via the CAN bus. The first challenge response may include the first challenge request signed by the battery using the battery private key.

In an embodiment, the charger computing device 108 may be further configured to verify the first challenge response by using the battery public key. By using this step of verification, the charger computing device 108 verifies the proof of possession of the battery private key by the battery 112. The charger computing device 108 may be further configured to generate the random identifier and communicate the battery authentication status and the random identifier to the battery 112 via the CAN bus. The battery authentication status and the random identifier may be communicated to the battery 112 based on successful verification of the first challenge response. The battery authentication status may indicate successful authentication of the battery 112 by the charger computing device 108 of the battery charger associated with the battery swapping and charging station 106. In some embodiments, the generation of the random identifier may be optional. Thus, the charger computing device 108 may communicate the random identifier along with the battery authentication status to the battery 112 only when the random identifier is generated by the charger computing device 108. However, the charger computing device 108 may only communicate the battery authentication status to the battery 112 when the random identifier is not generated by the charger computing device 108.

In an embodiment, the battery 112 may be further configured to communicate the second authentication request (and/or the random identifier) to the charger computing device 108 via the CAN bus. The charger computing device 108 may be further configured to verify the random identifier when received along with the second authentication request from the battery 112. Further, based on the second authentication request (and/or upon successful verification of the random identifier), the charger computing device 108 may be configured to communicate the second authentication response to the battery 112 via the CAN bus. The second authentication response may include at least one of the charger certificate or the charger manufacturer certificate. The charger certificate may be a digital certificate that certifies the authenticity of the battery charger associated with the battery swapping and charging station 106. The charger manufacturer certificate may be a digital certificate that certifies the authenticity of a manufacturer of the battery charger associated with the battery swapping and charging station 106.

In an embodiment, the battery 112 may be further configured to verify at least one of the charger certificate or the charger manufacturer certificate. At least one of the charger certificate or the charger manufacturer certificate may be verified based on the intermediate certificate and the root certificate. The root certificate and the intermediate certificate are digital certificates that may be used to verify the authenticity of at least one of the charger certificate or the charger manufacturer certificate. The charger certificate, the charger manufacturer certificate, the root certificate, and the intermediate certificate together form a correlated chain of trust that ensures the authenticity of the battery charger associated with the battery swapping and charging station 106.

In an exemplary embodiment, the number of certificates included in the second authentication response may depend on a level of certificate chain (such as 3 levels of certificate chain or 4 levels of certificate chain) implemented for executing the offline mutual authentication between the battery 112 and the battery charger of the battery swapping and charging station 106. For example, in the 3 levels of certificate chain, 3 certificates such as the charger certificate, the intermediate certificate, and the root certificate may be used. In such a case, the second authentication response may only include the charger certificate that is verified by using the intermediate certificate and the root certificate. However, in the 4 levels of certificate chain, 4 certificates such as the charger certificate, the charger manufacturer certificate, the intermediate certificate, and the root certificate may be used. In such a case, the second authentication response may include the charger certificate and the charger manufacturer certificate that are verified by using the intermediate certificate and the root certificate.

In an embodiment, based on successful verification of at least one of the charger certificate or the charger manufacturer certificate, the battery 112 may be further configured to generate the second random number. The battery 112 may be further configured to generate the second challenge request including at least the second random number and communicate the second challenge request to the charger computing device 108 via the CAN bus. The charger computing device 108 may be further configured to communicate the second challenge response corresponding to the second challenge request to the battery 112 via the CAN bus. The second challenge response may include the second challenge request signed by the charger computing device 108 using the charger private key. The battery 112 may be further configured to verify the second challenge response by using the charger public key. By using this step of verification, the battery 112 verifies the proof of possession of the charger private key by the charger computing device 108. Subsequently, the battery 112 may be further configured to communicate the charger authentication status to the charger computing device 108 via the CAN bus. The charger authentication status may be communicated based on successful verification of the second challenge response. The charger authentication status may indicate successful authentication of the battery charger associated with the battery swapping and charging station 106 by the battery 112. Various other functionalities and operations associated with the offline mutual authentication have been described in detail in conjunction with FIGS. 2, 3A-3D, 4A-4C, and 5.

Figure 2:
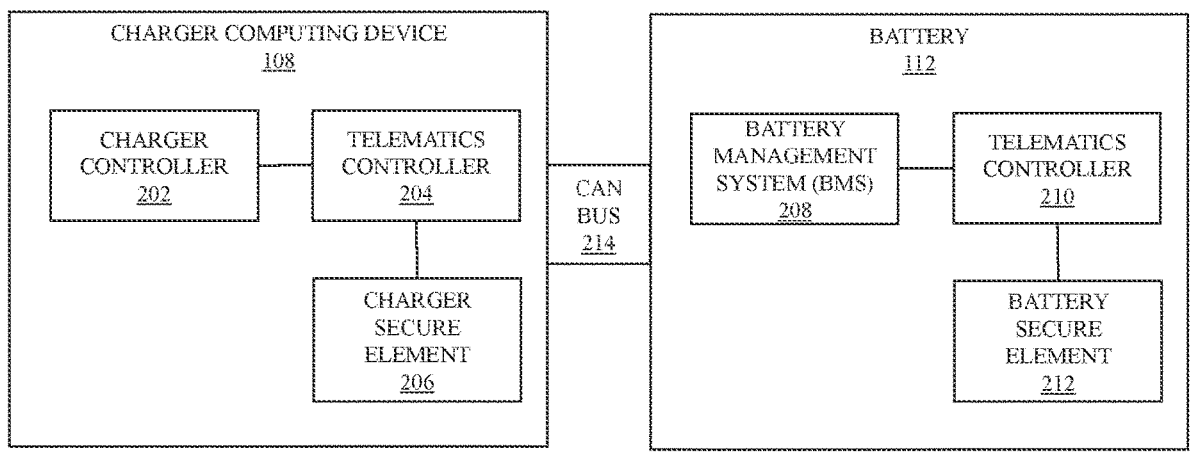
FIG. 2 is a block diagram of a charger computing device of a battery swapping and charging station and a battery of an electric vehicle of the system environment of FIG. 1, in accordance with an exemplary embodiment of the disclosure.
Figure 3A:
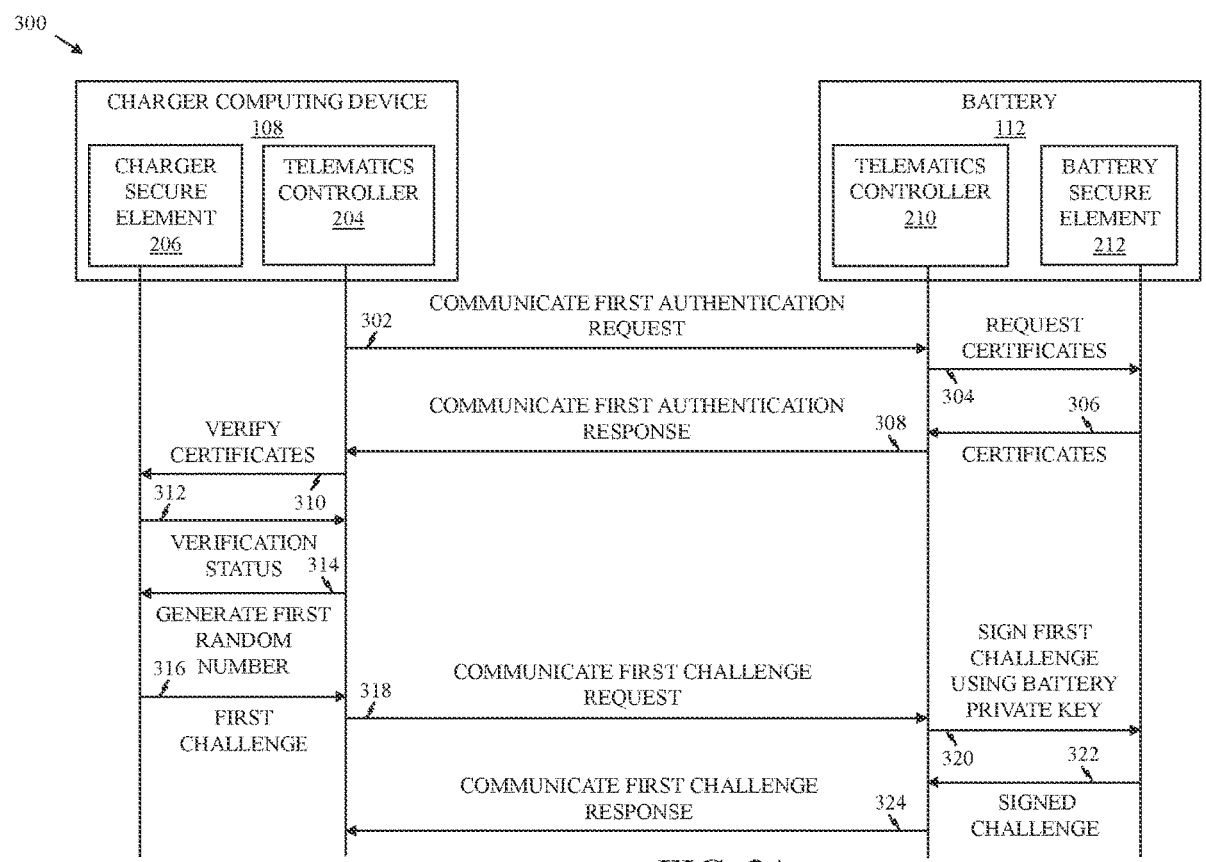
FIGS. 3A, 3B, 3C, and 3D, collectively, represent a process flow diagram that illustrates an exemplary scenario for performing the offline mutual authentication for the battery swapping, in accordance with an exemplary embodiment of the disclosure.
Figure 3B:
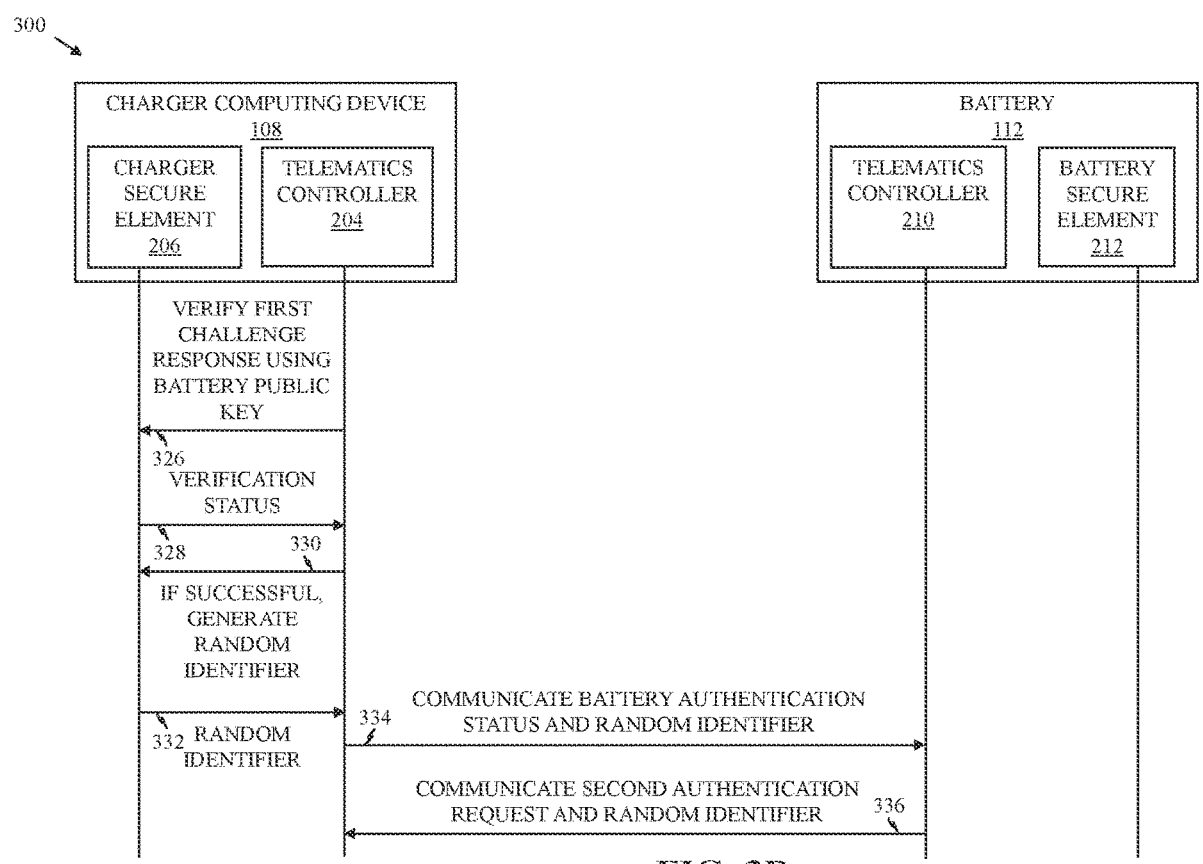
Figure 3C:
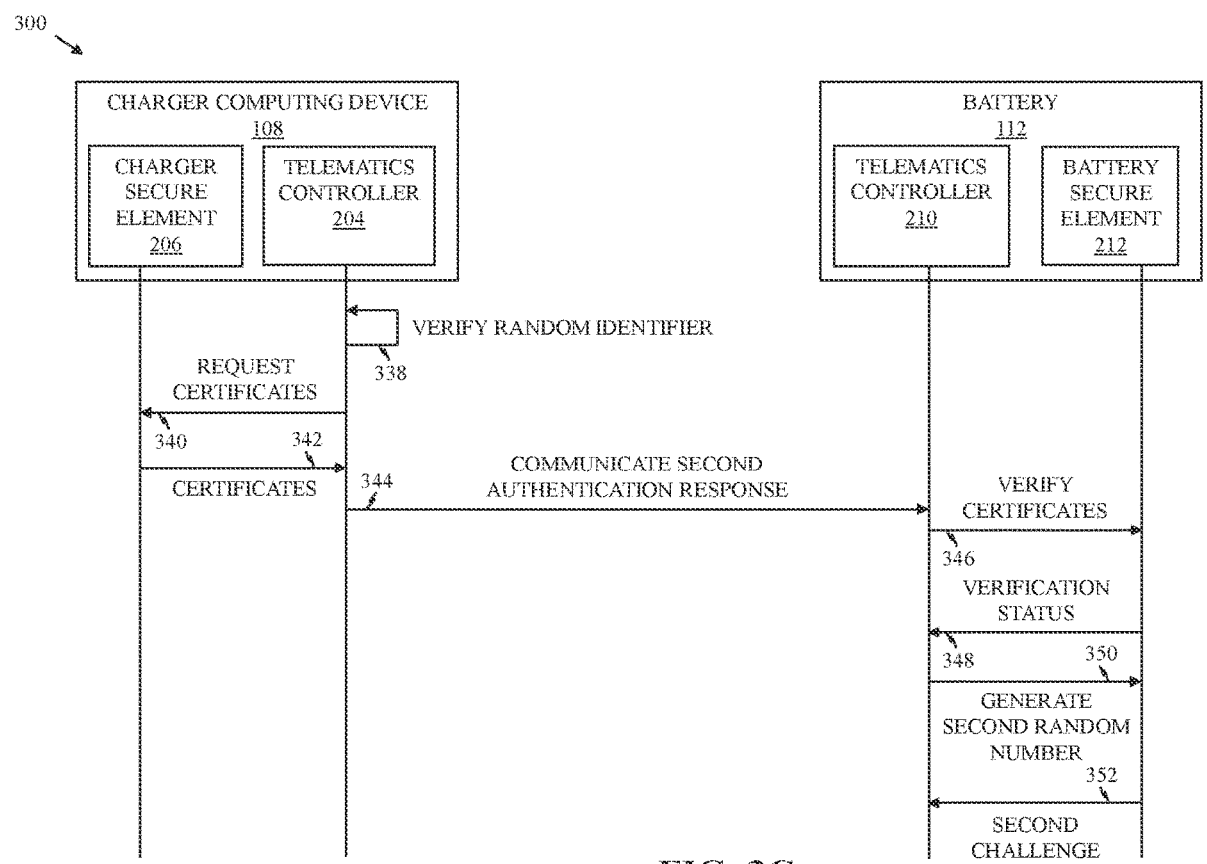
Figure 3D:
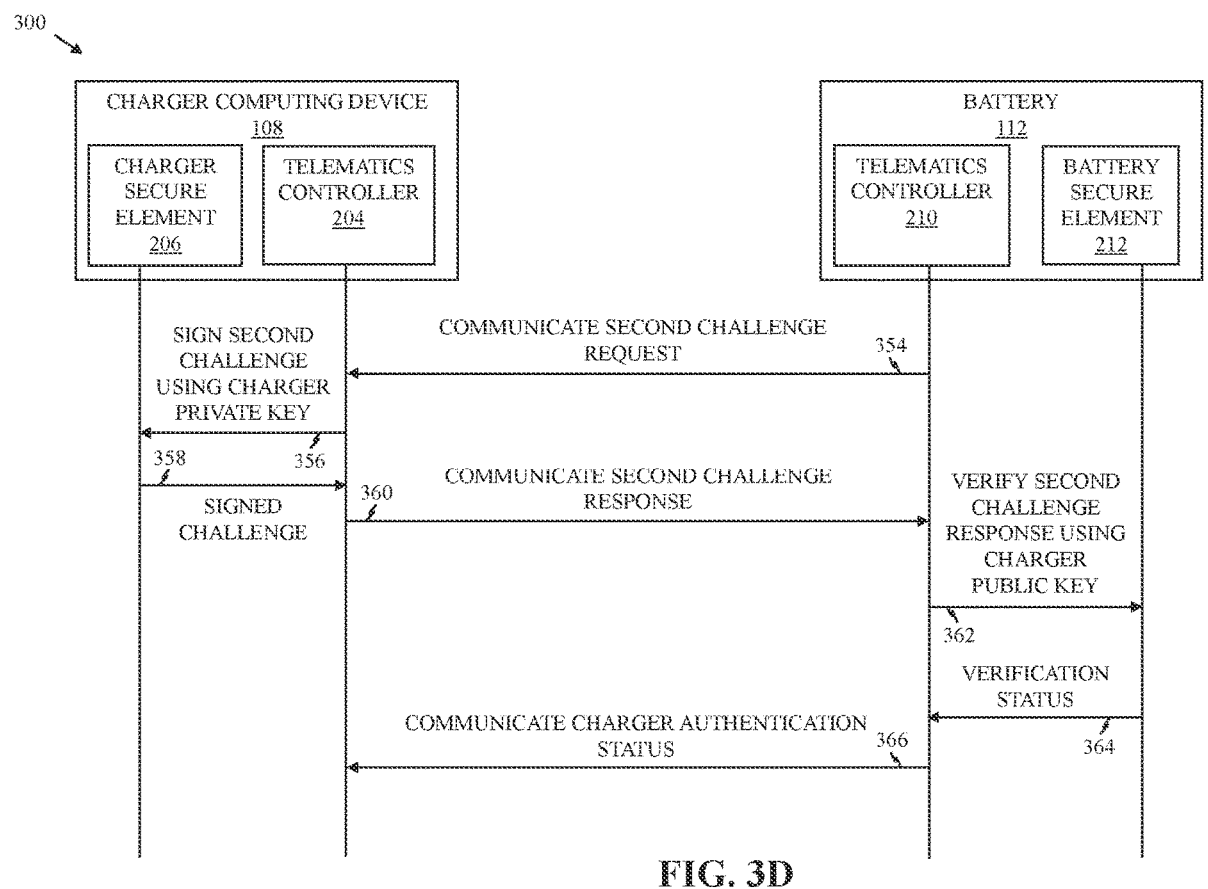

FIG. 2 is a block diagram of the charger computing device 108 of the battery swapping and charging station 106 and the battery 112 of the electric vehicle 102, in accordance with an exemplary embodiment of the disclosure. The charger computing device 108 may include circuitry such as a charger controller 202, a telematics controller 204, and a charger secure element 206. The battery 112 may include circuitry such as a battery management system (BMS) 208, a telematics controller 210, and a battery secure element 212. The charger computing device 108 and the battery 112 may communicate with each other via the CAN bus 214.

The charger controller 202 may include suitable logic, circuitry, interfaces, and/or code, executable by the circuitry, that may be configured to perform one or more operations for performing the offline mutual authentication. In general, the charger controller 202 may control and manage functioning of the charger computing device 108 of the battery charger associated with the battery swapping and charging station 106. In an embodiment, the charger controller 202 may be configured to monitor and collect one or more parameters (for example, input voltage range, output voltage range, frequency, or the like) associated with the battery charger. The charger controller 202 may be further configured to monitor operating environment of the battery charger. Further, in an instance of an abnormal or unsuitable operating environment, the charger controller 202 may be configured to communicate an alert or notification to a notification module (not shown) associated with the battery swapping and charging station 106.

In an embodiment, the charger controller 202 may be further configured to maintain a log of one or more batteries swapped and/or charged at the battery swapping and charging station 106. The log may include a battery identifier associated with each of the one or more batteries swapped and/or charged at the battery swapping and charging station 106. The battery identifier may be used to identify each of the one or more batteries that has been swapped and/or charged at the battery swapping and charging station 106. The log may further include health data (that indicates a state of health relative to its ideal condition), charging level data (that indicates a level of charge relative to its ideal capacity), historical authentication data, or the like of each of the one or more batteries that has been swapped and/or charged at the battery swapping and charging station 106.

In an embodiment, the charger controller 202 may be further configured to verify at least one of the battery certificate or the battery manufacturer certificate by using the root certificate and the intermediate certificate. The charger controller 202 may be further configured to communicate a verification status corresponding to verification of at least one of the battery certificate or the battery manufacturer certificate to the telematics controller 204. The charger controller 202 may be further configured to generate the first random number and the random identifier. The charger controller 202 may be further configured to verify the first challenge response by using the battery public key. The charger controller 202 may be further configured to sign the second challenge request using the charger private key.

The telematics controller 204 may include suitable logic, circuitry, interfaces, and/or code, executable by the circuitry, that may be configured to perform one or more operations for performing the offline mutual authentication. In general, the telematics controller 204 may be configured to communicate and receive data, required for performing the offline mutual authentication, to/from the battery 112 of the electric vehicle 102. The telematics controller 204 may be further configured to retrieve the required data from the charger controller 202, the charger secure element 206, or any other module of the charger computing device 108.

In an embodiment, the telematics controller 204 may be further configured to communicate the first authentication request to the battery 112. The telematics controller 204 may be further configured receive the first authentication response from the battery 112. The telematics controller 204 may be further configured to communicate the first challenge request to the battery 112. The telematics controller 204 may be further configured to receive the first challenge response from the battery 112. The telematics controller 204 may be further configured to communicate the first random number and the battery authentication status to the battery 112. The telematics controller 204 may be further configured to receive the second random number and the second authentication request from the battery 112. The telematics controller 204 may be further configured to instruct the charger controller 202 to verify the random identifier. The telematics controller 204 may be further configured to request at least one of the charger certificate or the charger manufacturer certificate from the charger secure element 206. The telematics controller 204 may be further configured to communicate, based on successful verification of the random identifier, the second authentication response, including at least one of the charger certificate or the charger manufacturer certificate, to the battery 212. The telematics controller 204 may be further configured to receive the second challenge from the battery 112. The telematics controller 204 may be further configured to instruct the charger controller 202 to sign the second challenge using the charger private key. The telematics controller 204 may be further configured to communicate the second challenge response to the battery 112. The telematics controller 204 may be further configured to receive the charger authentication status from the battery 112.

The charger secure element 206 may include suitable logic, circuitry, interfaces, and/or code, executable by the circuitry, that may be configured to store data required for the offline mutual authentication. In an embodiment, the charger secure element 206 may be accessed by the telematics controller 204 and/or the charger controller 202 for retrieval of the data stored therein. The charger controller 202, the telematics controller 204, and the charger secure element 206 may communicate with each other via Serial Peripheral Interface (SPI). In an embodiment, the charger secure element 206 may be configured to store the charger private key and the battery public key.

In an embodiment, the charger secure element 206 may be further configured to store the charger certificate, the charger manufacturer certificate, the intermediate certificate, and the root certificate. The charger certificate may be a digital certificate that certifies the authenticity of the battery charger. The charger manufacturer certificate may be a digital certificate that certifies the authenticity of a manufacturer of the battery charger. Further, the root certificate and the intermediate certificate may be digital certificates that are used to verify the authenticity of the charger certificate and the charger manufacturer certificate. Beneficially, the charger certificate, the charger manufacturer certificate, the root certificate, and the intermediate certificate may together form a correlated chain of trust that ensures the authenticity of the battery charger.

In an embodiment, the charger secure element 206 may store the charger certificate, the charger manufacturer certificate, the root certificate, and the intermediate certificate in an encrypted form. It will be apparent to a person having ordinary skills in the art that the charger certificate, the charger manufacturer certificate, the root certificate, and the intermediate certificate may be encrypted by using one or more encryption techniques that are well known in the art without deviating from scope of the disclosure. The one or more encryption techniques may be based on Advanced Encryption Standard (AES), Triple Data Encryption Standard (3DES), Twofish, or the like. The charger secure element 206 may be configured to decrypt the charger certificate, the charger manufacturer certificate, the root certificate, and the intermediate certificate as and when required. The charger certificate, the charger manufacturer certificate, the root certificate, and the intermediate certificate may be decrypted based on one or more decryption techniques associated with the one or more encryption techniques used for encrypting the charger certificate, the charger manufacturer certificate, the root certificate, and the intermediate certificate.

The BMS 208 may include suitable logic, circuitry, interfaces, and/or code, executable by the circuitry, that may be configured to perform one or more operations associated with the offline mutual authentication. In general, the BMS 208 may be configured to manage the battery 112 of the electric vehicle 102 by protecting the battery 112 from operating outside its safe operating voltage range (such as 400-800 volts), monitoring its state, calculating data associated with the state of the battery 112, reporting that data to a specific or desired module of the electric vehicle 102, controlling its operating environment, authenticating the operating environment and/or balancing it. The BMS 208 may be further configured to communicate, via the CAN bus 214, with one or more modules of the electric vehicle 102 for ensuring a continuous power supply and optimal functioning of the electric vehicle 102.

In embodiment, the BMS 208 may communicate, to the user 104 of the electric vehicle 102 via a user interface component of the electric vehicle 102, information regarding a need for recharging the battery 112 or swapping the battery 112 with a charged battery such as the battery 114. In an embodiment, the BMS 208 may be further configured to maintain a log of one or more batteries used to power the electric vehicle 102. The log may include a battery identifier associated with the battery 112. The battery identifier may be used to identify the battery 112 that has been used to power the electric vehicle 102. The log may further include health data (that indicates a state of health relative to its ideal condition), charging level data (that indicates a level of charge relative to its ideal capacity), historical authentication data, or the like associated with the battery 112.

The telematics controller 210 may include suitable logic, circuitry, interfaces, and/or code, executable by the circuitry, that may be configured to perform one or more operations associated with the offline mutual authentication. The telematics controller 210 may be configured to communicate and receive data, required for performing the offline mutual authentication, to/from one or more modules of the battery 112 and/or the electric vehicle 102. In general, the telematics controller 210 may be configured to retrieve the required data from the BMS 208 and the battery secure element 212.

In an embodiment, the telematics controller 210 may be further configured to receive the first authentication request from the telematics controller 204. The telematics controller 210 may be further configured to request the battery secure element 212 for obtaining at least one of the battery certificate or the battery manufacturer certificate. The telematics controller 210 may be further configured to communicate the first authentication response, including at least one of the battery certificate or the battery manufacturer certificate, to the telematics controller 204. The telematics controller 210 may be further configured to receive the first challenge request from the telematics controller 204. The telematics controller 210 may be further configured to instruct the battery secure element 212 to sign the first challenge request using the battery private key. The telematics controller 210 may be further configured to communicate the first challenge response to the telematics controller 204. The telematics controller 210 may be further configured to receive the random identifier and/or the battery authentication status from the telematics controller 204. The telematics controller 210 may be further configured to communicate the random identifier and/or the second authentication request to the telematics controller 204. The telematics controller 210 may be further configured to receive the second authentication response from the telematics controller 204. The telematics controller 210 may be further configured to instruct the battery secure element 212 to verify the second authentication response. The telematics controller 210 may be further configured to communicate, based on successful verification of the second authentication response, the second challenge request to the telematics controller 204. The telematics controller 210 may be further configured to receive the second challenge response from the telematics controller 204. The telematics controller 210 may be further configured to instruct the battery secure element 212 to verify the second challenge response. The telematics controller 210 may be further configured to communicate the charger authentication status to the telematics controller 204.

The battery secure element 212 may include suitable logic, circuitry, interfaces, and/or code, executable by the circuitry, that may be configured to perform one or more operations associated with the offline mutual authentication. The battery secure element 212 may be configured to store data required for the offline mutual authentication. In an embodiment, the battery secure element 212 may be accessed by the telematics controller 210 and/or the BMS 208 for retrieval of the data stored therein. The BMS 208, the telematics controller 210, and the battery secure element 212 may communicate with each other via Serial Peripheral Interface (SPI).

In an embodiment, the battery secure element 212 may be configured to store the battery certificate, the battery manufacturer certificate, the intermediate certificate, and the root certificate. The battery certificate may be a digital certificate that certifies the authenticity of the battery 112. The battery manufacturer certificate may be a digital certificate that certifies the authenticity of a manufacturer of the battery 112. Further, the root certificate and the intermediate certificate may be digital certificates that are used to verify the authenticity of the battery certificate and the battery manufacturer certificate. Beneficially, the battery certificate, the battery manufacturer certificate, the root certificate, and the intermediate certificate together form a correlated chain of trust that ensures the authenticity of the battery 112.

In an embodiment, the battery secure element 212 may store the battery certificate, the battery manufacturer certificate, the root certificate, and the intermediate certificate in an encrypted form. It will be apparent to a person having ordinary skills in the art that the battery certificate, the battery manufacturer certificate, the root certificate, and the intermediate certificate may be encrypted by using one or more encryption techniques that are well known in the art without deviating from scope of the disclosure. The one or more encryption techniques may be based on AES, 3DES, Twofish, or the like. The battery secure element 212 or the telematics controller 210 may be further configured to decrypt the certificates based on one or more decryption techniques associated with the one or more encryption techniques used form encrypting the certificates.

In an embodiment, the battery secure element 212 may be further configured to store the battery private key and the charger public key. In an embodiment, the battery secure element 212 may be further configured to verify, based on instructions received from the telematics controller 210, at least one of the charger certificate or the charger manufacturer certificate by using the root certificate and the intermediate certificate. The battery secure element 212 may be further configured to communicate a verification status corresponding to verification of at least one of the charger certificate or the charger manufacturer certificate to the telematics controller 210. The battery secure element 212 may be further configured to generate the second random number. The battery secure element 212 may be further configured to sign the first challenge request using the battery private key. The battery secure element 212 may be further configured to verify the second challenge response by using the charger public key.

The CAN bus 214 may include suitable logic, circuitry, interfaces, and/or code, executable by the circuitry, that may be configured to perform one or more operations associated with data communication between the charger computing device 108 and the battery 112. The CAN bus 214 may correspond to a vehicle communication channel or network that allows various devices to connect and communicate with each other without using any external network. The CAN bus 214 is based on a message-based protocol that facilitates exchange of data between various devices. In an embodiment, the CAN bus 214 may be configured to facilitate a communicative coupling between the charger computing device 108 and the battery 112. In an exemplary embodiment, the CAN bus 214 may be further configured to facilitate parallel communication between various devices or components in an efficient and effective manner.

FIGS. 3A, 3B, 3C, and 3D, collectively, represent a process flow diagram 300 that illustrates an exemplary scenario for performing the offline mutual authentication for the battery swapping, in accordance with an exemplary embodiment of the disclosure.

In an instance, when the battery 112 of the electric vehicle 102 needs to be recharged or swapped, the offline mutual authentication is required to be performed between the battery 112 and the battery charger associated with the battery swapping and charging station 106. The offline mutual authentication may be performed to authenticate the battery 112 of the electric vehicle 102 and the battery charger associated with the battery swapping and charging station 106.

Firstly, the charger computing device 108 may be configured to communicate the first authentication request to the battery 112 of the electric vehicle 102 (as shown by arrow 302). In other words, the telematics controller 204 may be configured to communicate the first authentication request to the telematics controller 210 (as shown by arrow 302). In an embodiment, the first authentication request may include a request for obtaining at least one the battery certificate or the battery manufacturer certificate from the battery 112. The communication of the first authentication request by the charger computing device 108 initiates the offline mutual authentication process between the battery charger and the battery 112 available at the battery swapping and charging station 106.

In an embodiment, the telematics controller 210 of the battery 112 may be configured to receive the first authentication request. The telematics controller 210 may be further configured to request at least one of the battery certificate or the battery manufacturer certificate from the battery secure element 212 (as shown by arrow 304). The one or more certificates are requested in response to the received first authentication request.

In an embodiment, the battery secure element 212 may be configured to communicate at least one of the battery certificate or the battery manufacturer certificate to the telematics controller 210 (as shown by arrow 306). In an exemplary embodiment, the battery certificate and the battery manufacturer certificate may be encrypted using the one or more encryption techniques.

It will be apparent to a person having ordinary skills in the art that the battery certificate and the battery manufacturer certificate may be encrypted using the one or more encryption techniques that are well known in the art without deviating from scope of the disclosure. The one or more encryption techniques may be based on Advanced Encryption Standard (AES), Triple Data Encryption Standard (3DES), Twofish, or the like.

In an embodiment, the telematics controller 210 may be further configured to communicate the first authentication response to the telematics controller 204 of the charger computing device 108 (as shown by arrow 308). The first authentication response includes at least one of the battery certificate or the battery manufacturer certificate.

In an embodiment, the telematics controller 204 may be configured to, upon receiving the first authentication response, initiate verification of the first authentication response. The telematics controller 204 may be further configured to communicate at least one of the battery certificate or the battery manufacturer certificate to the charger secure element 206 (as shown by arrow 310).

In an embodiment, the charger secure element 206 may be further configured to verify at least one of the battery certificate or the battery manufacturer certificate based on the intermediate certificate and the root certificate. The battery certificate, the battery manufacturer certificate, the intermediate certificate, and the root certificate may be generated by a company producing the battery 112, the battery charger, or a third part entity. Verification of at least one of the battery certificate or the battery manufacturer certificate based on the intermediate certificate and the root certificate ensures that the battery 112 is associated with an authentic source such as the company manufacturing the battery 112 and the battery charger. Beneficially, the verification of at least one of the battery certificate or the battery manufacturer certificate by using the intermediate certificate and the root certificate facilitates establishment of a chain of trust between the battery 112 and the battery charger. The chain of trust formed by verifying at least one of the battery certificate or the battery manufacturer certificate by using the intermediate certificate and the root certificate ensures that the battery 112 and the battery charger are compatible. The charger secure element 206 may be further configured to communicate, upon successful verification of at least one of the battery certificate or the battery manufacturer certificate, the verification status to the telematics controller 204 (as shown by arrow 312). A successful verification status indicates that at least one of the battery certificate or the battery manufacturer certificate are authentic. An unsuccessful verification status indicates that the battery certificate and the battery manufacturer certificate are not authentic.

In an embodiment, the telematics controller 204 instructs the charger secure element 206 to generate the first random number (as shown by arrow 314). In an embodiment, the charger secure element 206 may be configured to generate and communicate the first challenge request to the telematics controller 204 (as shown by arrow 316). The first challenge request includes the first random number. In an embodiment, the telematics controller 204 may be configured to generate the first challenge request including the first random number received from the charger secure element 206. The telematics controller 204 may be further configured to communicate the first challenge request to the telematics controller 210 (as shown by arrow 318).

In an embodiment, the telematics controller 210 may be configured to instruct the battery secure element 212, upon receiving the first challenge request, to sign the first challenge request using the battery private key (as shown by arrow 320). In an embodiment, the battery secure element 212 may be configured to communicate the first challenge response i.e., the first challenge request signed with the battery private key to the telematics controller 210 (as shown by arrow 322). In an exemplary embodiment, the battery secure element 212 may be configured to sign the first random number included in the first challenge request using the battery private key. Further, the telematics controller 210 may be configured to communicate the first challenge response to the telematics controller 204 (as shown by arrow 324).

In an embodiment, the telematics controller 204 may be configured to instruct the charger secure element 206 to verify the first challenge response (as shown by arrow 326). Further, the charger secure element 206 may be configured to verify the first challenge response using the battery public key. In an embodiment, the charger secure element 206 communicates the verification status of the first challenge response to the telematics controller 204 (as shown by arrow 328). The telematics controller 204 may be configured to instruct, upon successful verification of the first challenge response, the charger secure element 206 to generate the random identifier (as shown by arrow 330). Further, the charger secure element 206 may be configured to communicate the random identifier to the telematics controller 204 (as shown by arrow 332). In an embodiment, the telematics controller 204 may be configured to communicate the battery authentication status and the random identifier to the telematics controller 210 (as shown by arrow 334).

In an embodiment, the telematics controller 210 may be further configured to communicate the second authentication request and the random identifier to the telematics controller 204 (as shown by arrow 336). The telematics controller 204 may be further configured to verify the random identifier (as shown by arrow 338). Beneficially, such verification of the random identifier ensures the authenticity of the battery 112. In one embodiment, the telematics controller 204 may verify the random identifier by instructing the charger secure element 206 to perform a comparison with the previously generated random identifier. In another embodiment, the telematics controller 204 may verify the random identifier by performing a comparison with the previously generated random identifier retrieved from the charger secure element 206.

In an embodiment, the telematics controller 204 may be configured to request, based on successful verification of the random identifier, the charger secure element 206 for at least one of the charger certificate or the charger manufacturer certificate (as shown by arrow 340). The charger secure element 206 may be further configured to communicate at least one of the charger certificate or the charger manufacturer certificate to the telematics controller 204 (as shown by arrow 342).

In an embodiment, the telematics controller 204 may be further configured to communicate the second authentication response to the telematics controller 210 (as shown by arrow 344). The second authentication response may include at least one of the charger certificate or the charger manufacturer certificate associated with the battery charger.

In an embodiment, the telematics controller 210 may be configured to initiate, upon receiving the second authentication response, verification of the second authentication response. The telematics controller 210 may be further configured to instruct the battery secure element 212 to verify at least one of the charger certificate or the charger manufacturer certificate based on the intermediate certificate and the root certificate (as shown by arrow 346). The charger certificate, the charger manufacturer certificate, the intermediate certificate, and the root certificate may be manufactured by the company manufacturing the battery 112, the battery charger, or a third party entity. Verification of at least one of the charger certificate or the charger manufacturer certificate based on the intermediate certificate and the root certificate ensures that the battery 112 and the battery charger are associated with an authentic source such as a company manufacturing the battery 112 and the battery charger.

In an embodiment, the charger certificate, the charger manufacturer certificate may be encrypted using one or more encryption techniques. The one or more encryption techniques may be based on Advanced Encryption Standard (AES), Triple Data Encryption Standard (3DES), Twofish, or the like. Furthermore, at least one of the telematics controller 210 and the battery secure element 212 may be configured to decrypt the encrypted charger certificate and the charger manufacturer certificate using one or more decryption techniques corresponding to the one or more encryption techniques.

In an embodiment, the battery secure element 212 may be further configured to communicate, upon verifying at least one of the charger certificate or the charger manufacturer certificate by using the intermediate certificate and the root certificate, the verification status to the telematics controller 210 (as shown by arrow 348). Beneficially, the verification of at least one of the charger certificate or the charger manufacturer certificate based on the intermediate certificate and the root certificate facilitates establishment of a chain of trust between the battery 112 and the battery charger.

In an embodiment, the telematics controller 210 may be further configured to instruct, upon successful verification of the second authentication response, the battery secure element 212 to generate the second random number (as shown by arrow 350). Further, the battery secure element 212 may be configured to generate the second random number and communicate the second challenge request, including the second random number, to the telematics controller 210 (as shown by arrow 352). Further, the telematics controller 210 may be configured to communicate the second challenge request to the telematics controller 204 of the charger computing device 108 (as shown by arrow 354).

In an embodiment, the telematics controller 204 may be configured to instruct, upon receiving the second challenge request, the charger secure element 206 to sign the second challenge request using the charger private key (as shown by arrow 356). Further, the charger secure element 206 may be configured to communicate, upon signing the second challenge request using the charger private key, the second challenge response to the telematics controller 204 (as shown by arrow 358). The second challenge response includes the second challenge request signed with the charger private key. Further, the telematics controller 204 may be configured to communicate the second challenge response to the telematics controller 210 (as shown by arrow 360).

In an embodiment, the telematics controller 210 may be configured to receive the second challenge response and initiate verification of the second challenge response by instructing the battery secure element 212 to verify the second challenge response using the charger public key (as shown by arrow 362). In an embodiment, the battery secure element 212 may be configured to communicate the verification status of the second challenge response to the telematics controller 210 (as shown by arrow 364). Further, the telematics controller 210 may be further configured to communicate, upon receiving successful verification status of the second challenge response, the charger authentication status to the telematics controller 204 (as shown by arrow 366).

Thus, various methods and systems of the disclosure provide the offline mutual authentication during the battery swapping or charging process. The disclosed methods and systems allow for the offline mutual authentication between the battery 112 and the battery charger associated with the battery swapping and charging station 106. The offline mutual authentication prevents misuse of the battery 112 and the battery charger. The disclosed methods and systems create a secure offline authentication mechanism that avoids server dependency as it is complete offline based. The offline authentication mechanism helps in stopping any sniffing attack on the CAN bus 214 as the mechanism does not use any sensitive data.

Figure 4A:
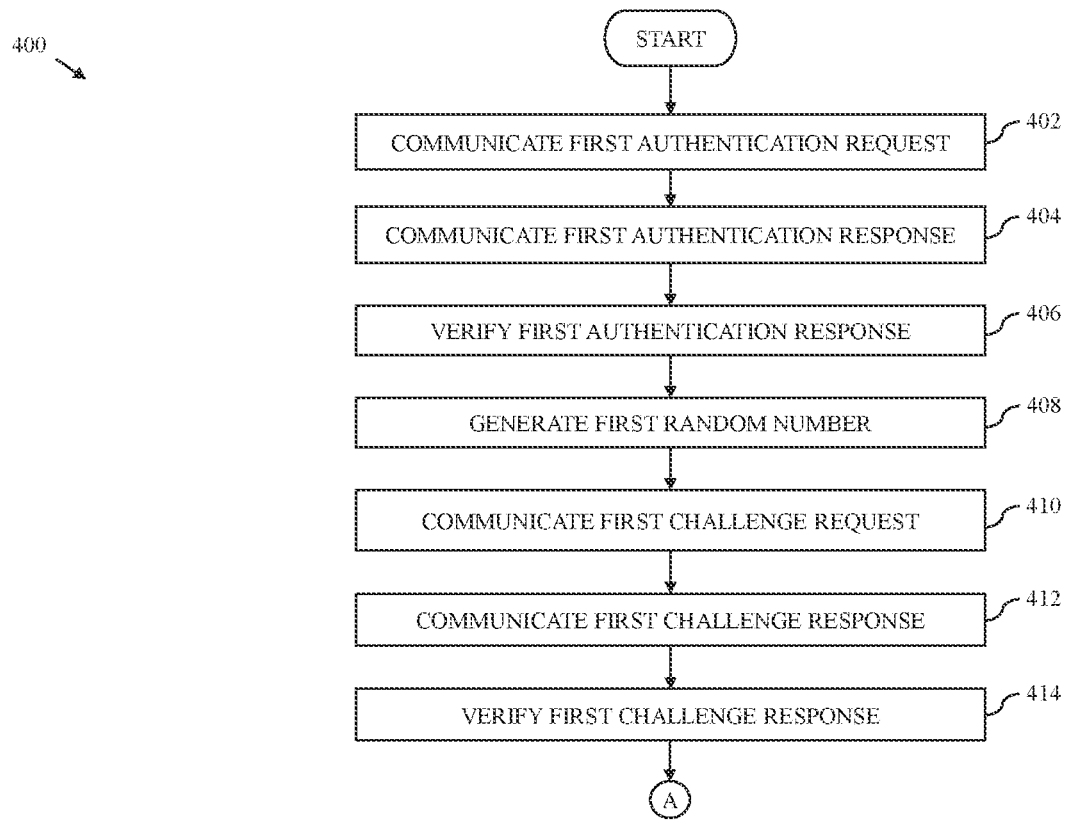
FIGS. 4A, 4B, and 4C, collectively, illustrate a flow chart of a method for performing the offline mutual authentication for the battery swapping, in accordance with an exemplary embodiment of the disclosure.
Figure 4B:
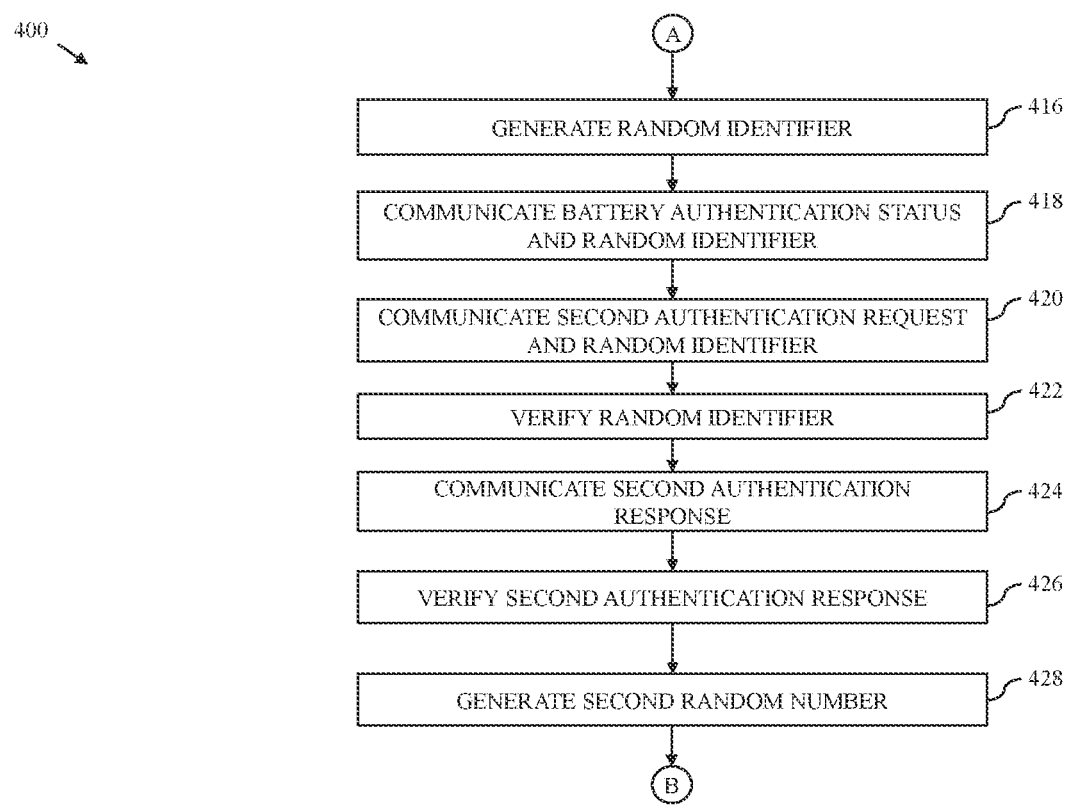
Figure 4C:
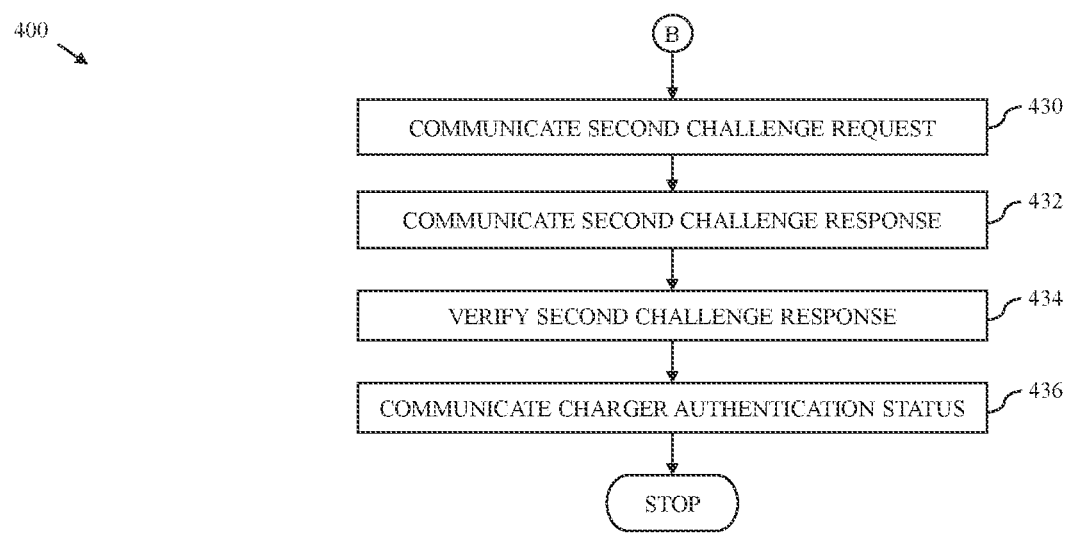

FIGS. 4A, 4B, and 4C, collectively, illustrate a flow chart 400 of a method for performing the offline mutual authentication for the battery swapping, in accordance with an exemplary embodiment of the disclosure.

At 402, the first authentication request is communicated. In an embodiment, the charger computing device 108 may be configured to communicate the first authentication request to the battery 112 via the CAN bus 214. In an embodiment, the first authentication request may include a request for obtaining at least one of the battery certificate or the battery manufacturer certificate from the battery 112.

At 404, the first authentication response is communicated. In an embodiment, based on the received first authentication request, the battery 112 may be configured to communicate the first authentication response to the charger computing device 108 via the CAN bus 214. The first authentication response may include at least one of the battery certificate or the battery manufacturer certificate associated with the battery 112.

At 406, the first authentication response is verified. In an embodiment, the charger computing device 108 may be further configured to verify the first authentication response. The charger computing device 108 may perform verification of the first authentication response by verifying at least one of the battery certificate or the battery manufacturer certificate. At least one of the battery certificate or the battery manufacturer certificate may be verified based on the intermediate certificate and the root certificate.

At 408, the first random number is generated. In an embodiment, the charger computing device 108 may be further configured to generate the first random number. The first random number may be generated based on successful verification of at least one of the battery certificate or the battery manufacturer certificate. In an embodiment, the first random number may be dynamic in nature and may be different every time the offline mutual authentication is initiated.

At 410, the first challenge request is communicated. In an embodiment, the charger computing device 108 may be further configured to communicate the first challenge request including at least the first random number to the battery 112 via the CAN bus 214. The first challenge request may be communicated to the battery 112 based on successful verification of at least one of the battery certificate or the battery manufacturer certificate.

At 412, the first challenge response is communicated. In an embodiment, the battery 112 may be further configured to communicate the first challenge response to the charger computing device 108 via the CAN bus 214. The first challenge response may include the first challenge request signed by the battery 112 using the battery private key.

At 414, the first challenge response is verified. In an embodiment, the charger computing device 108 may be further configured to verify the first challenge response. The charger computing device 108 may verify the first challenge response by using the battery public key.

At 416, the random identifier is generated. In an embodiment, the charger computing device 108 may be further configured to generate the random identifier. The random identifier may be generated based on successful verification of the first challenge response. In an embodiment, the random identifier may be dynamic in nature and may be different every time the offline mutual authentication is initiated.

At 418, the battery authentication status and the random identifier are communicated. In an embodiment, the charger computing device 108 may be further configured to communicate the battery authentication status and the random identifier to the battery 112 via the CAN bus 214. The battery authentication status and the random identifier may be communicated to the battery 112 based on successful verification of the first challenge response. The battery authentication status may indicate successful authentication of the battery 112 by the charger computing device 108 of the battery charger associated with the battery swapping and charging station 106.

At 420, the second authentication request and the random identifier are communicated. In an embodiment, the battery 112 may be further configured to communicate the second authentication request and the random identifier to the charger computing device 108 via the CAN bus 214. In an embodiment, the second authentication request may include a request for obtaining at least one of the charger certificate or the charger manufacturer certificate from the charger computing device 108.

At 422, the random identifier is verified. In an embodiment, the charger computing device 108 may be further configured to verify the random identifier. The random identifier may be verified by performing a comparison check with the previously generated and stored random identifier. Beneficially, such verification of the random identifier ensures the authenticity of the battery 112.

At 424, the second authentication response is communicated. In an embodiment, the charger computing device 108 may be further configured to communicate the second authentication response to the battery 112 via the CAN bus 214. The second authentication response may include at least one of the charger certificate or the charger manufacturer certificate associated with the battery charger of the battery swapping and charging station 106.

At 426, the second authentication response is verified. In an embodiment, the battery 112 may be further configured to verify the second authentication response. The battery 112 may perform verification of the second authentication response by verifying at least one of the charger certificate or the charger manufacturer certificate. At least one of the charger certificate or the charger manufacturer certificate may be verified based on the intermediate certificate and the root certificate.

At 428, the second random number is generated. In an embodiment, the battery 112 may be further configured to generate the second random number. The second random number may be generated based on successful verification of the second authentication response. In an embodiment, the second random number may be dynamic in nature and may be different every time the offline mutual authentication is initiated.

At 430, the second challenge request is communicated. In an embodiment, the battery 112 may be further configured to communicate the second challenge request including the second random number to the charger computing device 108 via the CAN bus 214.

At 432, the second challenge response is communicated. In an embodiment, the charger computing device 108 may be further configured to communicate the second challenge response to the battery 112 via the CAN bus 214. The second challenge response may include the second challenge request signed by the charger computing device 108 using the charger private key.

At 434, the second challenge response is verified. In an embodiment, the battery 112 may be further configured to verify the second challenge response by using the charger public key.

At 436, the charger authentication status is communicated. In an embodiment, the battery 112 may be further configured to communicate the charger authentication status to the charger computing device 108 via the CAN bus 214. The charger authentication may be communicated to the battery 112 based on successful verification of the second challenge response. The charger authentication status may indicate successful authentication of the battery charger associated with the battery swapping and charging station 106 by the battery 112.

Figure 5:
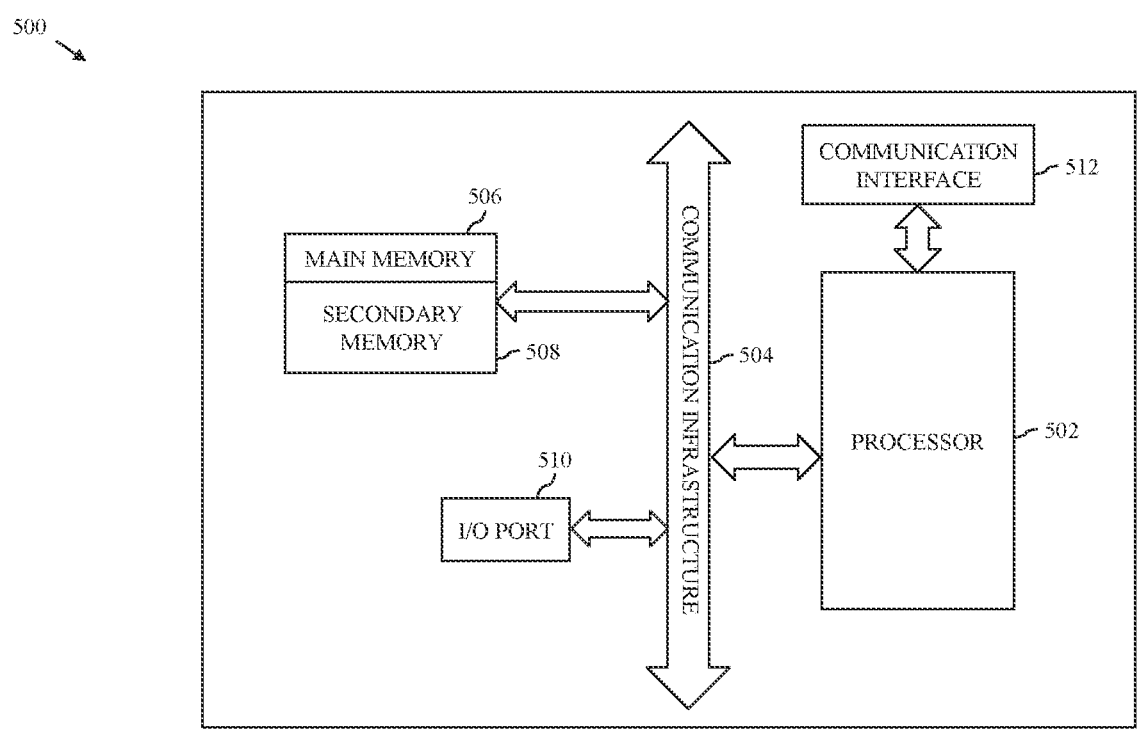
FIG. 5 is a block diagram that illustrates a system architecture of a computer system for performing the offline mutual authentication for the battery swapping, in accordance with an exemplary embodiment of the disclosure.

FIG. 5 is a block diagram that illustrates a system architecture of a computer system 500 for performing the offline mutual authentication for the battery swapping, in accordance with an exemplary embodiment of the disclosure. An embodiment of the disclosure, or portions thereof, may be implemented as computer readable code on the computer system 500. In one example, the charger computing device 108 and the battery 112 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the offline mutual authentication method of FIGS. 4A-4C.

The computer system 500 may include a processor 502 that may be a special purpose or a general-purpose processing device. The processor 502 may be a single processor, multiple processors, or combinations thereof. The processor 502 may have one or more processor "cores." Further, the processor 502 may be coupled to a communication infrastructure 504, such as a bus, a bridge, a message queue, multi-core message-passing scheme, the communication network, the CAN bus 214, or the like. The computer system 500 may further include a main memory 506 and a secondary memory 508. Examples of the main memory 506 may include RAM, ROM, and the like. The secondary memory 508 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage unit may be a non-transitory computer readable recording media.

The computer system 500 may further include an input/output (I/O) port 510 and a communication interface 512. The I/O port 510 may include various input and output devices that are configured to communicate with the processor 502. Examples of the input devices may include a keyboard, a mouse, a joystick, a touchscreen, a microphone, and the like. Examples of the output devices may include a display screen, a speaker, headphones, and the like. The communication interface 512 may be configured to allow data to be transferred between the computer system 500 and various devices that are communicatively coupled to the computer system 500. Examples of the communication interface 512 may include a modem, a network interface, i.e., an Ethernet card, a communication port, and the like. Data transferred via the communication interface 512 may be signals, such as electronic, electromagnetic, optical, or other signals as will be apparent to a person skilled in the art. The signals may travel via a communications channel, such as the CAN bus 214, which may be configured to transmit the signals to the various devices that are communicatively coupled to the computer system 500. Examples of the communication channel may include a wired, wireless, and/or optical medium such as cable, fiber optics, a phone line, a cellular phone link, a radio frequency link, and the like. The main memory 506 and the secondary memory 508 may refer to non-transitory computer readable mediums that may provide data that enables the computer system 500 to implement the offline mutual authentication method illustrated in FIGS. 4A-4C.

Various embodiments of the disclosure provide the battery 112 of the electric vehicle 102 and the charger computing device 108 associated with the battery swapping and charging station 106 for performing offline mutual authentication for battery swapping or charging. The charger computing device 108 may be configured to initiate the offline mutual authentication. The charger computing device 108 may be further configured to communicate the first authentication request, via CAN bus 214, to the battery 112. The battery 112 may be configured to respond by communicating, via the CAN bus 214, the first authentication response to the charger computing device 108. The first authentication response includes at least one of the battery certificate or the battery manufacturer certificate. In an embodiment, the charger computing device 108 may be further configured to verify at least one of the battery certificate or the battery manufacturer certificate based on the intermediate certificate and the root certificate. The charger computing device 108 may be further configured to generate the first random number and communicate the first challenge request, including the first random number, to the battery 112 based on successful verification of at least one of the battery certificate or the battery manufacturer certificate. The battery 112 may be configured to communicate the first challenge response corresponding to the first challenge request to the charger computing device 108 via the CAN bus 214. In an embodiment, prior to communicating the first challenge response, the battery 112 may be configured to sign the first challenge response using the battery private key. Further, the charger computing device 108 may be further configured to verify the first challenge response by using the battery public key. The charger computing device 108 may also be configured to generate the random identifier and communicate, via the CAN bus 214, the battery authentication status and the random identifier to the battery 112 based on successful verification of the first challenge response. Further, the battery 112 may also be configured to communicate, via the CAN bus 214, the second authentication request and the random identifier to the charger computing device 108. The charger computing device 108 may be configured to verify the random identifier and communicate, via the CAN bus 214, the second authentication response to the battery 112 based on successful verification of the random identifier. The second authentication response may include at least one of the charger certificate or the charger manufacturer certificate. In an embodiment, the battery 112 may be configured to verify at least one of the charger certificate or the charger manufacturer certificate based on the intermediate certificate and the root certificate. The battery may be configured to generate the second random number upon successful verification of at least one of the charger certificate or the charger manufacturer certificate. The battery 112 may be further configured to communicate, via the CAN bus 214, the second challenge request, including the second random number, to the charger computing device 108. The charger computing device 108 may be further configured to communicate to the battery 112, via the CAN bus 214, the second challenge response corresponding to the second challenge request. The battery may be further configured to verify the second challenge response by using the charger public key. The battery 112 may be further configured to communicate to the charger computing device 108, via the CAN bus 214, the charger authentication status based on successful verification of the second challenge response.

Various embodiments of the disclosure provide a non-transitory computer readable medium having stored thereon, computer executable instructions, which when executed by a computer, cause the computer to execute operations for the offline mutual authentication for battery swapping or charging. The operations include communicating, by the charger computing device 108 associated with the battery swapping and charging station 106, via the CAN bus 214, the first authentication request to the battery 112 of the electric vehicle 102. The operations further include communicating, by the battery 112 to the charger computing device 108, via the CAN bus 214, in response to the first authentication request, the first authentication response including at least one of the battery certificate or the battery manufacturer certificate. The operations further include verifying, by the charger computing device 108, at least one of the battery certificate or the battery manufacturer certificate. The operations further include verifying at least one of the battery certificate or the battery manufacturer certificate based on the intermediate certificate and the root certificate. The operations further include communicating, by the charger computing device 108, via the CAN bus 214, the first challenge request to the battery 112 based on successful verification of at least one of the battery certificate or the battery manufacturer certificate. The first challenge request includes the first random number generated by the charger computing device 108. The operations further include communicating, by the battery 112 to the charger computing device 108, via the CAN bus 214, the first challenge response corresponding to the first challenge request signed by using the battery private key. The operations further include verifying, by the charger computing device 108, the first challenge response by using the battery public key. The operations further include communicating, by the charger computing device 108, the battery authentication status and the random identifier to the battery 112 based on successful verification of the first challenge response. The operations further include communicating, by the battery 112 to the charger computing device 108, via the CAN bus 214, the second authentication request and the random identifier. The operations further include verifying, by the charger computing device 108, the random identifier received from the battery 112. The operations further include communicating, by the charger computing device 108 to the battery 112, via the CAN bus 214, in response to the second authentication request, the second authentication response including at least one of the charger certificate or the charger manufacturer certificate based on successful verification of the random identifier. The operations further include verifying, by the battery 112, at least one of the charger certificate or the charger manufacturer certificate. The battery 112 verifies at least one of the charger certificate or the charger manufacturer certificate based on the intermediate certificate and the root certificate. The operations further include communicating, by the battery 112 to the charger computing device 108, via the CAN bus 214, the second challenge request based on successful verification of at least one of the charger certificate or the charger manufacturer certificate. The second challenge request includes second random number generated by the battery 112. The operations further include communicating, by the charger computing device 108 to the battery 112, via the CAN bus 214, the second challenge response corresponding to the second challenge request signed by using the charger private key. The operations include verifying, by the battery 112, the second challenge response by using the charger public key. Further, the operations include, communicating, by the battery 112 to the charger computing device 108, the charger authentication status based on successful verification of the second challenge response.

The disclosed embodiments encompass numerous advantages. Exemplary advantages of the disclosed method and systems include, but are not limited to, ensuring an uninterrupted mutual authentication of a battery (such as the battery 112) of an electric vehicle (such as the electric vehicle 102) and a battery charger associated with a battery swapping and charging station (such as the battery swapping and charging station 106) at all times. The disclosed method and systems allow for an offline mutual authentication of the battery and the battery charger. Therefore, the battery may be recharged and/or swapped even when network connectivity is unavailable. The offline authentication disclosed herein includes verification of at least one of a battery certificate or a battery manufacturer certificate based on a root certificate and an intermediate certificate and verification of at least one of a charger certificate or a charger manufacturer certificate based on the root certificate and the intermediate certificate. Beneficially, such verifications ensure that the battery and the battery charger are associated with an authentic source such as a company manufacturing the battery and the battery charger. Further, successful verification of the first challenge response and the second challenge response ensures that the battery and the charger are authentic in nature and the battery may be charged and/or swapped using the charger associated with the battery swapping and charging station. The disclosed offline mutual authentication is performed based on verification of the plurality of certificates, the first challenge response, the second challenge request, and the random identifier. Therefore, eliminating requirement of communicating sensitive information associated with any of an individual associated with the vehicle, the vehicle, the battery, and the charger. Therefore, by virtue of the implementation of the disclosed methods and systems, theft, misuse of sensitive information, illegal swapping, theft, and unauthorized charging of the battery and the charger may be prevented. Further, sniffing and replay attacks are also prevented as a considerable portion of data used in the disclosed offline mutual authentication is generated dynamically.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the disclosure provide, among other features, systems and methods for performing the offline mutual authentication for battery swapping or charging. While various exemplary embodiments of the disclosed systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. An offline mutual authentication method for battery swapping, comprising:
   communicating, by a computing device associated with a battery swapping and charging station, via a controller area network (CAN) bus, a first authentication request to a battery of an electric vehicle;
   communicating, by the battery to the computing device via the CAN bus, based on the first authentication request, a first authentication response including at least one of a battery certificate or a battery manufacturer certificate;
   verifying, by the computing device, at least one of the battery certificate or the battery manufacturer certificate;
   communicating, by the computing device via the CAN bus, a first challenge request to the battery based on successful verification of at least one of the battery certificate or the battery manufacturer certificate;
   communicating, by the battery to the computing device via the CAN bus, a first challenge response corresponding to the first challenge request signed by using a battery private key;
   verifying, by the computing device, the first challenge response by using a battery public key;
   communicating, by the computing device via the CAN bus, a battery authentication status and a random identifier to the battery based on successful verification of the first challenge response;
   communicating, by the battery to the computing device via the CAN bus, a second authentication request and the random identifier;
   verifying, by the computing device, the random identifier;
   communicating, by the computing device to the battery via the CAN bus, based on the second authentication request, a second authentication response including at least one of a charger certificate or a charger manufacturer certificate on successful verification of the random identifier;
   verifying, by the battery, at least one of the charger certificate or the charger manufacturer certificate;
   communicating, by the battery to the computing device via the CAN bus, a second challenge request based on successful verification of at least one of the charger certificate or the charger manufacturer certificate;
   communicating, by the computing device to the battery via the CAN bus, a second challenge response corresponding to the second challenge request signed by using a charger private key;
   verifying, by the battery, the second challenge response by using a charger public key; and
   communicating, by the battery to the computing device via the CAN bus, a charger authentication status based on successful verification of the second challenge response.

2. The method of claim 1, wherein at least one of the battery certificate or the battery manufacturer certificate is verified, by the computing device, based on an intermediate certificate and a root certificate.

3. The method of claim 2, wherein at least one of the charger certificate or the charger manufacturer certificate is verified, by the battery, based on the intermediate certificate and the root certificate.

4. The method of claim 1, further comprising:
   generating, by the computing device, a first random number before communicating the first challenge request to the battery, wherein the first challenge request includes the first random number; and
   generating, by the computing device, the random identifier based on successful verification of the first challenge response.

5. The method of claim 4, further comprising generating, by the battery, a second random number before communicating the second challenge request to the computing device, wherein the second challenge request includes the second random number.

6. An offline mutual authentication system for battery swapping, comprising:
   a battery of an electric vehicle configured to:
      receive, via a controller area network (CAN) bus, a first authentication request from a computing device associated with a battery swapping and charging station;
      communicate, to the computing device via the CAN bus, based on the first authentication request, a first authentication response that includes a battery certificate and a battery manufacturer certificate;
      receive, from the computing device via the CAN bus, a first challenge request, wherein the first challenge request is received based on successful verification of the battery certificate and the battery manufacturer certificate by the computing device;
      communicate, to the computing device via the CAN bus, a first challenge response corresponding to the first challenge request signed by use of a battery private key;
      receive, from the computing device via the CAN bus, a battery authentication status based on successful verification of the first challenge response by the computing device;
      communicate, to the computing device via the CAN bus, a second authentication request;
      receive, from the computing device via the CAN bus, based on the second authentication request, a second authentication response that includes a charger certificate and a charger manufacturer certificate;
      verify the charger certificate and the charger manufacturer certificate;
      communicate, to the computing device via the CAN bus, a second challenge request based on successful verification of the charger certificate and the charger manufacturer certificate;
      receive, from the computing device via the CAN bus, a second challenge response corresponding to the second challenge request signed by use of a charger private key;
      verify the second challenge response by use of a charger public key; and communicate, to the computing device via the CAN bus, a charger authentication status based on successful verification of the second challenge response.

7. The system of claim 6, wherein the battery may be further configured to verify the charger certificate and the charger manufacturer certificate based on an intermediate certificate and a root certificate.

8. The system of claim 6, wherein the battery may be further configured to generate a first random number before communication of the second challenge request to the computing device, wherein the second challenge request includes the first random number.

9. The system of claim 6, wherein the battery includes at least a battery management system, a telematics control unit, and a battery secure element.

10. The system of claim 9, wherein the battery secure element may be configured to store at least one of the battery certificate and the battery manufacturer certificate.

11. An offline mutual authentication system for battery swapping, comprising:
a computing device, associated with a battery swapping and charging station, configured to:
communicate, via a controller area network (CAN) bus, a first authentication request to a battery of an electric vehicle;
receive, from the battery via the CAN bus, based on the first authentication request, a first authentication response that includes a battery certificate and a battery manufacturer certificate;
verify the battery certificate and the battery manufacturer certificate;
communicate, to the battery via the CAN bus, a first challenge request based on successful verification of the battery certificate and the battery manufacturer certificate;
receive, from the battery via the CAN bus, a first challenge response corresponding to the first challenge request signed by use of a battery private key;
verify the first challenge response by use of a battery public key;
communicate, to the battery via the CAN bus, a battery authentication status and a random identifier based on successful verification of the first challenge response;
receive, from the battery via the CAN bus, a second authentication request and the random identifier;
verify the random identifier;
communicate, to the battery via the CAN bus, based on the second authentication request, a second authentication response that includes a charger certificate and a charger manufacturer certificate based on successful verification of the random identifier;
receive, from the battery via the CAN bus, a second challenge request based on successful verification of the charger certificate and the charger manufacturer certificate by the battery;
communicate, to the battery via the CAN bus, a second challenge response corresponding to the second challenge request signed by use of a charger private key; and
receive, from the battery via the CAN bus, a charger authentication status based on successful verification of the second challenge response by the battery.

12. The system of claim 11, wherein the computing device may be further configured to verify the battery certificate and the battery manufacturer certificate based on an intermediate certificate and a root certificate.

13. The system of claim 11, wherein the computing device may be further configured to generate a first random number before communication of the first challenge request to the battery, wherein the first challenge request includes the first random number.

14. The system of claim 11, wherein the computing device may be further configured to generate the random identifier based on successful verification of the first challenge response.

15. The system of claim 11, wherein the computing device includes at least a charger control unit, a telematics control unit, and a charger secure element.

16. The system of claim 15, wherein the charger secure element may be configured to store at least one of the charger certificate and the charger manufacturer certificate.

* * * * *